(12) United States Patent
Bowles et al.

(10) Patent No.: US 6,830,798 B2
(45) Date of Patent: Dec. 14, 2004

(54) CONTINUOUS YARN LAID WET FRICTION MATERIAL

(75) Inventors: Laurie S. Bowles, Lafayette, IN (US); Samuel A. Truncone, Crawfordsville, IN (US); James J. Petroski, Crawfordsville, IN (US)

(73) Assignee: Raytech Composites, Inc., Crawfordsville, IN (US)

( * ) Notice: Subject to any disclaimer, the term of this patent is extended or adjusted under 35 U.S.C. 154(b) by 0 days.

(21) Appl. No.: 10/192,308

(22) Filed: Jul. 10, 2002

(65) Prior Publication Data

US 2003/0012940 A1 Jan. 16, 2003

Related U.S. Application Data

(60) Provisional application No. 60/304,360, filed on Jul. 10, 2001.

(51) Int. Cl.$^7$ .................................................. B32B 5/12
(52) U.S. Cl. ..................... 428/111; 428/212; 428/196; 428/364; 428/902; 156/184; 156/185; 427/179; 427/287
(58) Field of Search ................................ 428/111, 212, 428/196, 902, 364, 327.7, 408, 409, 698; 156/184, 185; 427/179, 287; 442/228, 220

(56) References Cited

U.S. PATENT DOCUMENTS

| | | | | |
|---|---|---|---|---|
| 5,127,949 A | * | 7/1992 | Nakazawa et al. | 106/36 |
| 5,895,716 A | * | 4/1999 | Fiala et al. | 428/408 |
| 5,952,249 A | * | 9/1999 | Gibson et al. | 442/179 |
| 5,965,658 A | * | 10/1999 | Smith et al. | 524/496 |
| 6,056,912 A | * | 5/2000 | Sohda et al. | 264/478 |
| 6,130,176 A | * | 10/2000 | Lam | 442/101 |
| 6,331,358 B1 | * | 12/2001 | Kitahara et al. | 428/447 |

* cited by examiner

Primary Examiner—Merrick Dixon
(74) Attorney, Agent, or Firm—Pyle & Piontek

(57) ABSTRACT

A friction disk suitable for running as an assembly of interleaved disks in a transmission is disclosed. A rigid metallic core on backing plate is covered on one or both sides with a wafer of non-woven yarn wherein the yarn comprises a continuous wound length of heat resistant yarn in a non-overlapping fashion. The yarn is bonded to the core by a thermosetting resin, which is impregnated into the yarn by less than 80% by weight to preserve porosity and allowing penetration of the cooling transmission fluid. The yarn preferably is composed of carbon fibers or filaments.

10 Claims, 4 Drawing Sheets

CONTINUOUS YARN LAID WET FRICTION MATERIAL

CROSS REFERENCE

This application claims the benefit of provisional patent application, Ser. No. 60/304,360, filed Jul. 10, 2001.

BACKGROUND

This invention relates to wet friction materials which run in a liquid lubricant and are employed in clutch, brake, transmission assemblies and the like.

Conventional wet friction materials are normally prepared by impregnating a wet-laid paper of cellulose or other fibers with a thermosetting resin and possible other friction modification agents or particles. The resin is cured by application of heat and pressure. The treated paper is adhered to a metal backing plate, and grooves may be formed on the surface of the friction layer to improve performance and circulation of cooling lubricant. The paper is made by conventional paper-making methods wherein a dilute slurry of fibers and other possible additives are deposited on a porous conveyor and dried.

Wet friction materials are formulated with ingredients and processes to achieve the frictional performance required for the desired or particular application. Significant performance indices include coefficient of friction, wear, material compression, fatigue, friction stability and torsional response. As discussed above, the majority of the current wet friction material are made using a wet-laid fiber process which provides a porous matrix of fibers, filler, binders and friction particles as required to achieve the desired performance.

There is a continuing need to develop and provide wet friction materials having improved performance under harsh conditions, such as may be encountered in continuously slipping torque converters, active transfer cases, slipping differentials and other high termally loaded applications.

Several proposals have been made to use carbon fibers or powders in wet friction materials. For example, it is known to employ fabrics of woven carbon yarns, or sprinkled carbon particles and pyrolytic carbon, in order to improve performance and durability at high temperatures.

Wet friction materials are easily distinguished from so-called dry friction materials which are designed to run in air rather than in a lubricating fluid. Dry friction materials have low porosity due to the high level of binders or resins, with the binder content greatly in excess of 80% by weight and the material being subjected to high densification. Wet friction materials, on the other hand, are only partially filled with cured resin and are designed to have good porosity, allowing penetration of the liquid lubricant/cooling liquid.

SUMMARY OF THE INVENTION

In accordance with the present invention, a continuous length of yarn is wound into a flat wafer shape or flat ring to provide the substrate for a wet friction material. The yarn comprises fibers or filaments of a high temperature and wear resistant natural or synthetic material, such as carbon, aramid, glass and the like, as well as mixtures of the former with each other or other types of fibers or filaments. The yarn or wafer is coated or impregnated with a suitable thermosetting resin, typically less than 80% by weight of the wafer, in order to allow a degree of porosity to be retained. The resin may contain conventional friction modifying particles and other agents. The resin impregnated wafer may then be cured and bonded to a metal backing disk or core or other relatively rigid support. In the alternative, an impregnated wafer may be formed and bonded to a core in a one step operation by forming the wafer directly onto the core.

In a preferred embodiment, the yarn is formed on a flat support or supports in a continuous spiral fashion, preferably with no overlapping of the yarn. This type of winding is referred to herein as "circumferential wound", and the yarns in the wafer may be closely adjacent or in contact. Overlapping yarn patterns are also possible to produce other versions of nonwoven fabrics but are less desired.

The wet friction material of the present invention is characterized in that it is not woven or braided but comprises a continuous length of yarn, without the yarn having attachment points except by virtue of the cured resin impregnated therein.

In an additional embodiment, the wound friction material is supported by a sublayer or backing of a layer of material which is more compliant than the friction material layer. This sublayer may take the form of a porous paper or other nonwoven bonded lightly with a thermosetting resin. The resulting friction plate would therefore comprise a metal backing plate or core, with splines on the inner or outer circumference, together with the outer layer of bonded nonwoven friction material with a sublayer of a compliant material bonded to one or both sides of the core.

The winding of the yarn is preferably carried out by winding between a pair of separable spaced flat platens having a central cylindrical core and being spaced apart approximately equal to the diameter of the yarn, together with a possible sublayer of compliant material.

The nature of the nonwoven porous friction material substrates of the present invention is adaptable to many variations in order to suit a variety of end use applications and properties. The yarn itself may comprise a blend of two or more different fibers and/or filaments. In addition, two or more stacked layers of wafers may be employed.

DETAILED DESCRIPTION

The present invention contemplates the winding of a continuous length of yarn to form a uniform pattern, typically in the form of a flat ring. The yarn wafer is impregnated with a thermosetting resin and is bonded on one or opposite sides of a relatively rigid core of iron or steel to produce a friction disk. The amount of resin applied by weight is less than 80% and most preferably less than 50% of the weight of the yarn wafer, such that the impregnated structure remains porous. The contemplated range of resin application is in the order of 20 to 80% with an application of 20–50% being most preferred.

The diameter of the yarn is preferably in the range of 0.5 to 3.0 mm. While any natural or synthetic fibers may be employed, the preferred materials comprise materials which remain stable at high temperatures and are wear resistant, such as carbon, aramid and glass. The yarns may be of the continuous filament variety or may comprise fibers as well as blends of fibers and filaments and blends of different fibers and filaments. The yarns typically have several twists to improve integrity. The preferred fiber or filament comprises carbon.

The uncured thermosetting resin is applied to the yarns either before or after winding, but preferably before. Suitable resins include, for example, phenolics, modified phenolics, epoxy, silicone, and the like, suitable for operating at high temperatures in cured form. The resin is preferably dissolved in a suitable solvent, such as water or an organic solvent prior to application to assure good penetration into the yarns. The solvent is eventually evaporated during curing of the resin by application of heat or by a separate evaporation step. This allows a significant amount of porosity to be retained in the finished disk.

Various additives may be incorporated into the resin solution. These include, for example, friction enhancing additives such as silica or other organic and inorganic friction particles, fillers, fatty acids and coupling agents.

Figure 1:
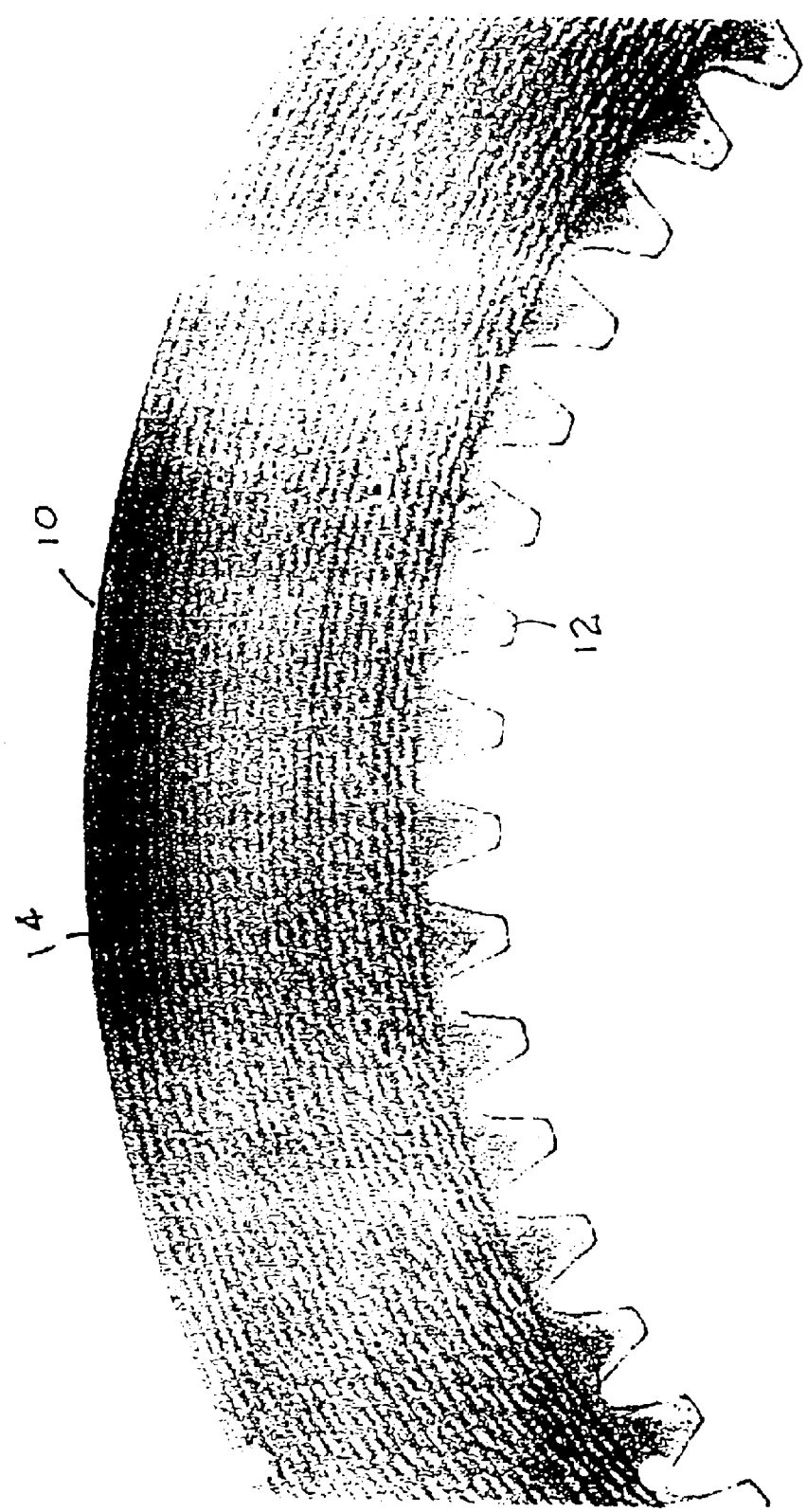
FIG. 1 is a plan view of a nonwoven wound continuous yarn friction material adhered to a splined metal backing member or core.

The continuous yarn preform may be formed as a single layer or two or more superimposed layers, provided that the layout of yarn in each layer is uniform. For examples a compliant layer of yarn or other compliant backing may be applied, followed by a less compliant layer. As noted elsewhere herein, the yarn preforms are bonded to a metal core, which, as shown in FIG. 1, is a ring-shaped member having splines 12 on its inner or outer perimeter. These friction disks are typically provided as an assembly. The disks may be provided with friction material of the present invention on both sides, in which case, the disks are interleaved with bare metal reaction plates. In another version, the friction material is provided on only one side of the core, and no reaction plates are used, so that the friction sides of the disks engage directly with the bare metal sides of adjacent disks. In all cases, the friction assembly runs in a liquid, which serves to lubricate and cool the assembly.

FIG. 1 shows a friction disk made by the circumferentially wound method. The disk comprises a core 10 in the shape of a ring having inner or outer splines 12. The continuous yarn 14 is applied in an increasing or decreasing spiral as shown, and the preform is bonded to the core 10 using either a separate application of uncured thermosetting resin or using uncured resin contained in the yarn. The yarn wraps, which extend 360 degrees around the ring, may be in contact or spaced. In addition, grooves, such as the radial grooves shown, may be cut in the friction material to improve liquid circulation and performance. Various types of groove patterns are well known and may be employed. Other finishing operations, such as the application of pressure from a flat press or grinding, are typically used to assure that the exposed friction layer is substantially level and flat.

The circumferentially wound version is made by winding of a continuous resin impregnated yarn between a pair of spaced flat plates separated by an inner circular spacing member. The spacing between the plates is approximately equal to the caliper of the yarn or yarn layers, as well as any backing material, such that there are no yarn overlaps during the winding procedure. One of the plates may be the metal core member 10 used in the friction assembly.

Figure 2:
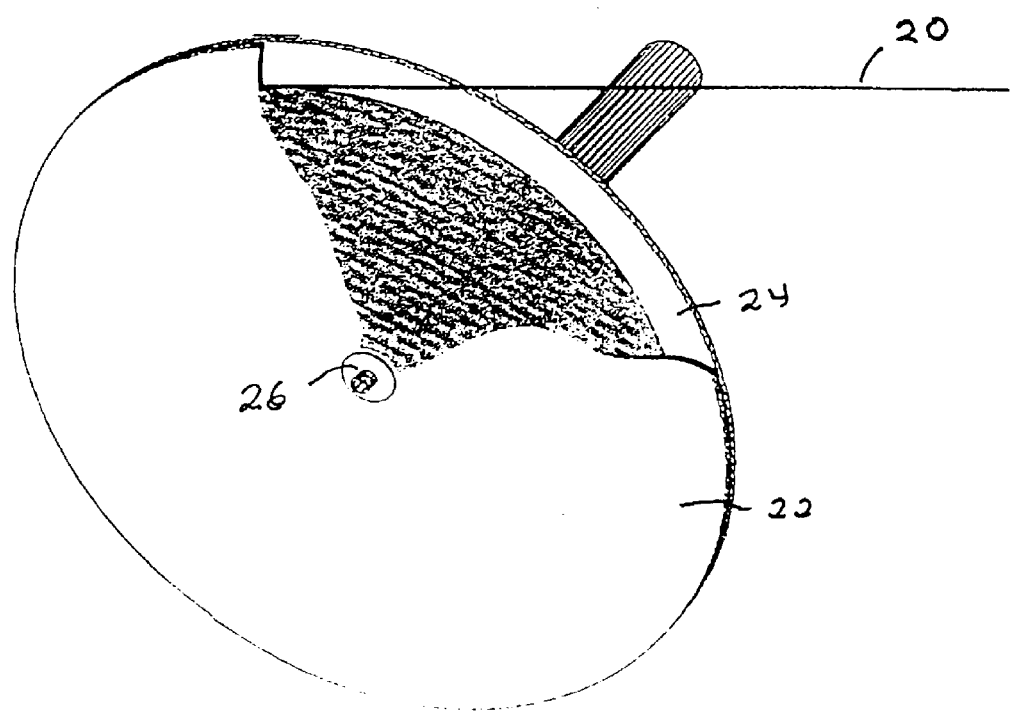
FIG. 2 is a perspective view of a winding apparatus which may be employed to make the friction material of the present invention.

FIG. 2 illustrates the winding of a continuous yarn 20 between two spaced platens 22 and 24 having a central core 26 of desired diameter. In the embodiment shown, the platens 22 and 24 rotate about a common axis and take up the yarn. One of the platens may serve as a core of a friction disk.

The resin in the yarn is then cured by heating the plates, such that the resulting wafer is coherent. If necessary, the cured wafer is removed from between the plates and bonded to the ring-shaped core with a thermosetting resin using heat and pressure. Additional finishing operations, such as surface grinding to assure a flat level surface, may be employed.

Figure 3:
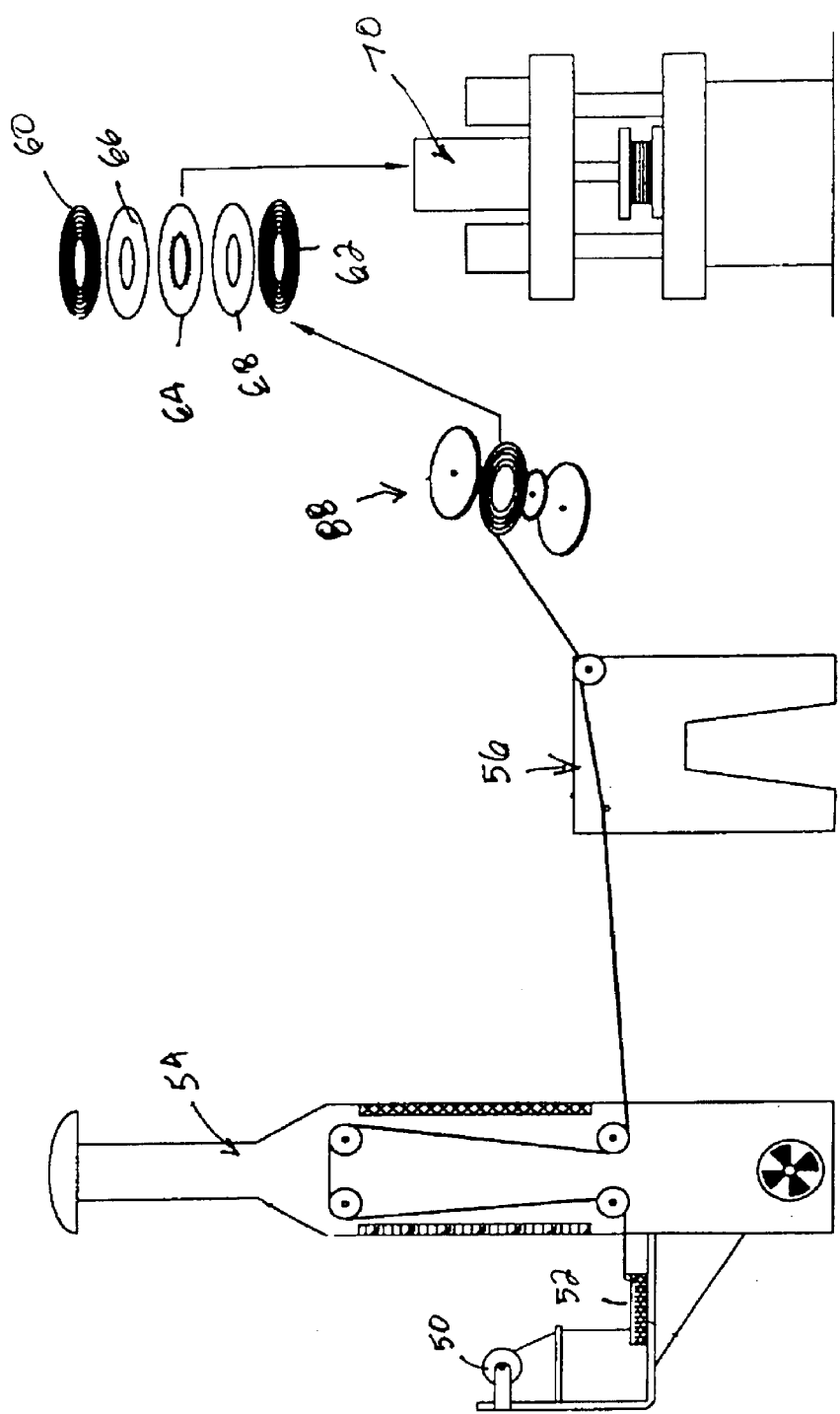
FIG. 3 is a schematic view illustrating a process which may be employed in carrying out the present invention.

FIG. 3 illustrates a schematic view of a suitable process for the present invention. A supply of yarn 50 is impregnated in a resin bath 52 and is passed through an oven 54 to partially cure the resin. The yarn is then passed through a lead in station 56 onto the winding device 88. Upon removal from the winding device, wound preforms 60 and 62 may be assembled on a backing plate or core 64 together with compliant sublayers 66 and 68 between the splined core 64 and then placed in a press 70 wherein the assembly is subjected to heat and pressure.

Figure 4:
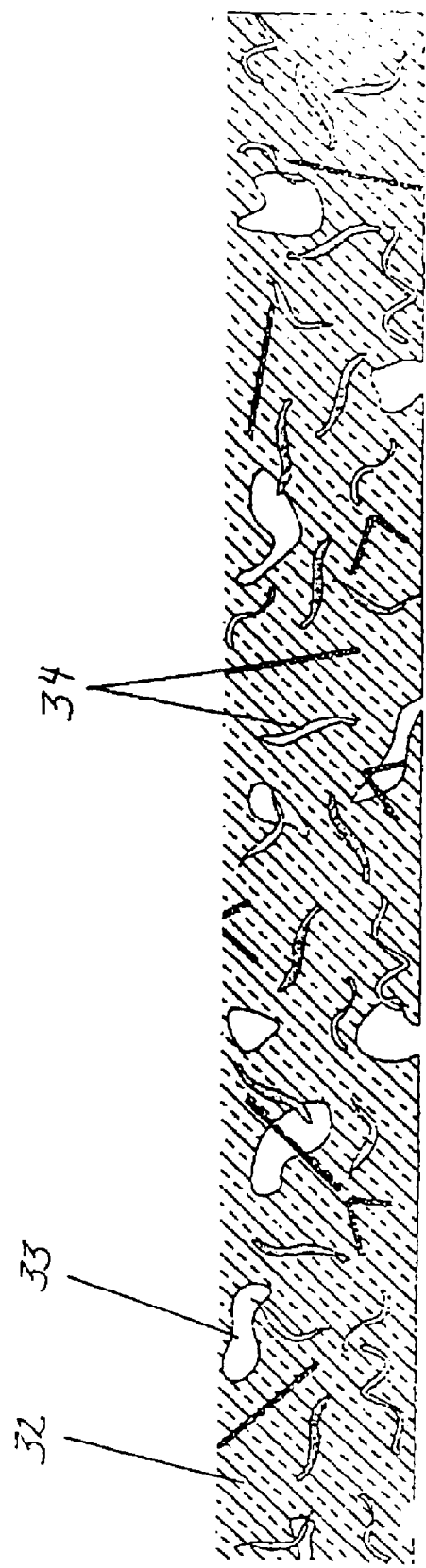
FIG. 4 illustrates a compliant backing material for the wound friction facing of the present invention.

In the preferred embodiment as shown in FIG. 4, the compliant layer comprises a nonwoven layer of fibers 34, partially impregnated with a thermosetting resin 32, such as a phenolic or the like, with the percentage of resin typically amounting to less than 60 percent. As a result, the compliant layer will typically contain a number of voids 33 and may additionally contain fillers. In one preferred embodiment, the compliant layer can be produced by a conventional papermaking process, in which a wet slurry of fibers such as cellulose or other natural or synthetic fibers are deposited on a porous conveyor and subsequently dried. The paper is then partially saturated with a solvent and resin mixture, and the solvent is evaporated.

In the final product, the continuous yarn is not completely saturated with resin, which allows yarn to remain porous, and the yarn is directly and principally the load carrying and friction generating interface. This is to be contrasted with a dry friction material wherein the surface is not porous and the yarns, if used, are heavily coated with rubber adhesive and resin and then molded. In this case the yarn or other fiberous material serves primarily as a reinforcement for the resin, and the cured resin provides the friction interface.

What is claimed is:

1. A wet friction disk comprising a core, a winding of a continuous yarn bonded to the core, said continuous yarn being impregnated with a thermosetting resin.

2. The friction disk of claim 1, wherein said yarn is in the form of a uniform spiral.

3. The wet friction disk of claim 1, wherein said winding of continuous yarn is bonded to said core by said thermosetting resin.

4. The wet friction disk of claim 1, wherein said yarn comprises carbon.

5. The wet friction disk of claim 1, wherein said core is a splined metallic core.

6. The wet friction disk of claim 1, wherein said winding is in the form of a continuous wafer, and the resin content by weight of the wafer is less than 80 percent, rendering the wafer porous to transmission fluids.

7. The wet friction disk of claim 1, additionally comprising a compliant layer bonded between said winding of continuous yarn and said core, said compliant layer being more compliance than said winding.

8. The friction disk of claim 2, wherein said yarn is contiguous.

9. Method of making a wet friction material comprising winding a continuous yarn between spaced platens in a spiral fashion to form a wafer, and then bonding said wafer to a metallic core.

10. The method of claim 9, wherein said yarn is partially impregnated with a thermosetting resin prior to winding.

* * * * *